(12) United States Patent
Pastrick et al.

(10) Patent No.: US 6,280,069 B1
(45) Date of Patent: *Aug. 28, 2001

(54) VEHICULAR EXTERIOR REARVIEW MIRROR SYSTEM WITH SIGNAL LIGHT ASSEMBLY

(75) Inventors: Todd W. Pastrick, Grand Haven; Linda K. Molenkamp, Fruitport; Roger L. Koops, Holland, all of MI (US)

(73) Assignee: Donnelly Corporation, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/630,332

(22) Filed: Jul. 31, 2000

Related U.S. Application Data

(63) Continuation of application No. 09/420,658, filed on Oct. 19, 1999, now Pat. No. 6,099,155, which is a continuation of application No. 09/232,316, filed on Jan. 18, 1999, now Pat. No. 6,074,077, which is a continuation of application No. 08/934,490, filed on Sep. 19, 1997, now Pat. No. 5,863,116, which is a continuation of application No. 08/607,285, filed on Feb. 26, 1996, now Pat. No. 5,669,705, which is a continuation of application No. 08/333,412, filed on Nov. 2, 1994, now Pat. No. 5,497,305, which is a continuation of application No. 08/011,947, filed on Feb. 1, 1993, now Pat. No. 5,371,659.

(51) Int. Cl.[7] ....................................................... B60Q 1/24
(52) U.S. Cl. ........................... 362/494; 362/135; 340/475
(58) Field of Search ..................................... 362/494, 464, 362/800, 135, 140, 544, 545; 340/468, 470, 472

(56) References Cited

U.S. PATENT DOCUMENTS 5,863,116 * 1/1999 Pastrick et al. ..................... 362/494
6,086,229 * 7/2000 Pastrick et al. ..................... 362/494

* cited by examiner

*Primary Examiner*—Thomas M. Sember
(74) *Attorney, Agent, or Firm*—Van Dyke, Gardner, Linn & Burkhart, LLP

(57) ABSTRACT

A floodlight that is adapted to projecting a pattern of light from the housing of a vehicle exterior mirror on an area adjacent a portion of the vehicle in order to create a lighted security zone in that area. The pattern extends laterally onto the vehicle and downwardly and rearwardly of the mirror housing. In this manner, the lighted security zone extends from the vehicle door to the rear of the vehicle. An actuator for the floodlight includes a base unit in the vehicle and a remote transmitter wherein the base unit is responsive to a signal from the remote transmitter in order to actuate the floodlight. The actuator may further include a lockout device in order to prevent actuation of the floodlight during operation of the vehicle. A signal light is additionally included in the exterior mirror housing in order to project a second pattern of light from the mirror housing extending laterally away from the vehicle and rearwardly of the vehicle. In this manner, the second pattern cannot be directly observed by the driver of the vehicle but may be observed by the driver of another vehicle passing the equipped vehicle. The signal light operates in unison with a turn signal, brake signal, or both, of the equipped vehicle.

50 Claims, 8 Drawing Sheets

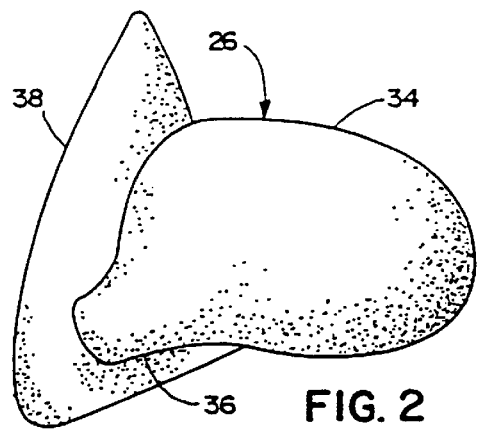
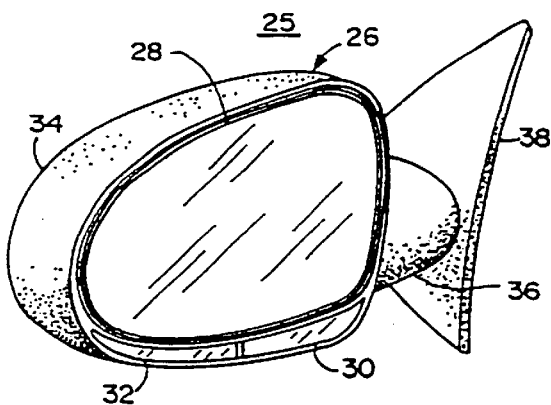
FIG. 1
FIG. 2
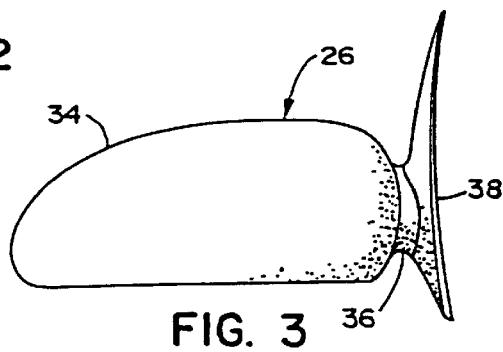
FIG. 3
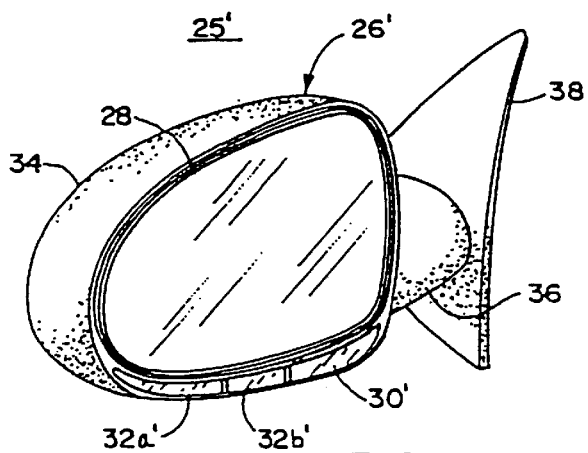
FIG. 4

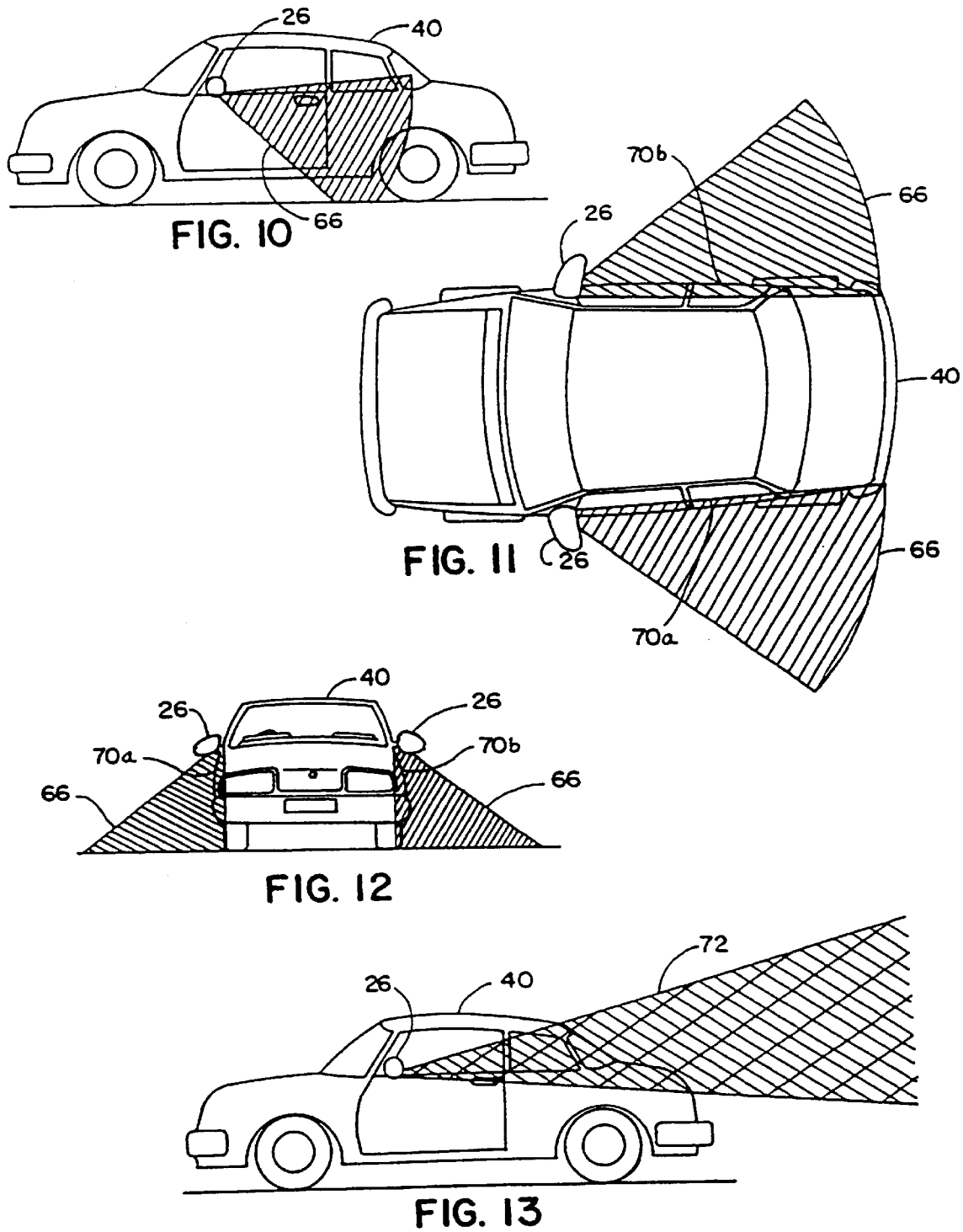

US 6,280,069 B1

VEHICULAR EXTERIOR REARVIEW MIRROR SYSTEM WITH SIGNAL LIGHT ASSEMBLY

CROSS REFERENCE TO RELATED APPLICATIONS

This is a continuation of prior application Ser. No. 09/420,658, filed on Oct. 19, 1999, now U.S. Pat. No. 6,099,155, which is a continuation of Ser. No. 09/232,316, filed on Jan. 18, 1999, now U.S. Pat. No. 6,074,077, which is a continuation of application Ser. No. 08/934,490, filed on Sep. 19, 1997, now U.S. Pat. No. 5,863,116, which is a continuation of application Ser. No. 08/607,285, filed on Feb. 26, 1996, now U.S. Pat. No. 5,669,705, which is a continuation of application Ser. No. 08/333,412, filed on Nov. 2, 1994, now U.S. Pat. No. 5,497,305, which is a continuation of application Ser. No. 08/011,947, filed on Feb. 1, 1993, now U.S. Pat. No. 5,371,659.

BACKGROUND OF THE INVENTION

This invention relates generally to security systems for vehicles and, more particularly, to remotely actuated, personal safety lighting systems. The invention is particularly adapted to incorporation in the exterior mirrors of a vehicle.

Personal security in and around vehicles has become an important concern. In particular, an increasing number of assaults and robberies are committed in parking lots while occupants are entering and exiting vehicles. While remote-operated, keyless entry systems have been incorporated in vehicles in order to unlock the vehicle and illuminate interior lights, such systems merely expedite entry to the vehicle and do not, per se, enhance security around the vehicle. Accordingly, a need exists for a vehicle security system to increase the security for vehicle occupants while entering and exiting the vehicle. Any such system would need to be aesthetically pleasing and not burdensome in use.

SUMMARY OF THE INVENTION

The present invention is intended to provide a personal safety feature for a vehicle in the form of a floodlight adapted to projecting light generally downwardly on an area adjacent a portion of the vehicle in order to create a lighted security zone in the area. Advantageously, the floodlight is preferably positioned in the housing of an exterior mirror having a reflective element also positioned in the housing. According to an aspect of the invention, an actuator is provided for the floodlight including a base unit in the vehicle and a remote transmitter. The base unit is responsive to a signal from the remote transmitter in order to actuate the floodlight. This allows the vehicle operator to actuate the floodlight from a distance in order to establish the security zone prior to approaching the vehicle.

According to another aspect of the invention, an actuator for the floodlight includes a lockout device in order to prevent actuation of the floodlight during operation of the vehicle. According to yet a further aspect of the invention, a signal light that is adapted to projecting light generally rearwardly of the vehicle is included in the exterior mirror housing. An actuator for the warning light is connected with the stoplight circuit, turn signal circuit, or both the stoplight and turn signal circuit, of the vehicle in order to actuate the warning light when either the stoplight or turn signal is being actuated.

According to yet another aspect of the invention, the floodlight is adapted to projecting a pattern of light from the housing on an area adjacent a portion of the vehicle that extends laterally onto the vehicle and downwardly and rearwardly of the vehicle. In this manner, a security zone is established from the vehicle door to the rear of the vehicle. The signal light is adapted to projecting a pattern of light extending laterally away from the vehicle and rearwardly of the vehicle. In this manner, the pattern generated by the signal light cannot be substantially observed by a driver of the vehicle. However, the pattern generated by the signal light may be observed by a driver of another vehicle passing the vehicle equipped according to the invention.

The floodlight and signal lights may be generated by a light emitting diode positioned in the housing, a vacuum fluorescent lamp positioned in the housing, an incandescent lamp positioned in the housing or a light source in the vehicle and a light pipe between the light source and the mirror housing.

By providing a lighted security zone adjacent the vehicle, users can observe suspicious activity around the vehicle. The pattern of light generated by a security light according to the invention establishes a security zone around, and even under, the vehicle in the important area where the users enter and exit the vehicle. The provision for remote actuation of the security light provides a deterrent to ward off persons lurking around the protected vehicle while the users are still at a safe distance from the vehicle. The provision for a lockout circuit ensures that the security light will not inadvertently be actuated while the vehicle is in motion. The invention, further, conveniently combines a signal light that acts in unison with the vehicle's turn signal, brake light, or both, with the security light in an exterior mirror assembly. The signal light may be designed to be observed by other vehicles passing the equipped vehicle but not directly by the driver of the equipped vehicle.

These and other objects, advantages and features of this invention will become apparent upon review of the following specification in conjunction with the drawings.

BRIEF DESCRIPTION OF THE DRAWINGS

FIG. 1 is a perspective view taken from the front of a mirror assembly (rear of the vehicle) incorporating the invention;

FIG. 2 is a rear view of the mirror assembly in FIG. 1;

FIG. 3 is a top view of the mirror assembly in FIG. 1;

FIG. 4 is the same view as FIG. 1 of an alternative embodiment of the invention;

FIG. 10 is a side elevation of a vehicle illustrating the security zone light pattern generated by a security light according to the invention;

FIG. 11 is a top plan view of the vehicle and light pattern in FIG. 10;

FIG. 12 is a rear elevation of the vehicle and light pattern in FIG. 10;

FIG. 13 is a side elevation of a vehicle illustrating the light pattern generated by a signal light useful with the invention;

DESCRIPTION OF THE PREFERRED EMBODIMENT

Figure 5:
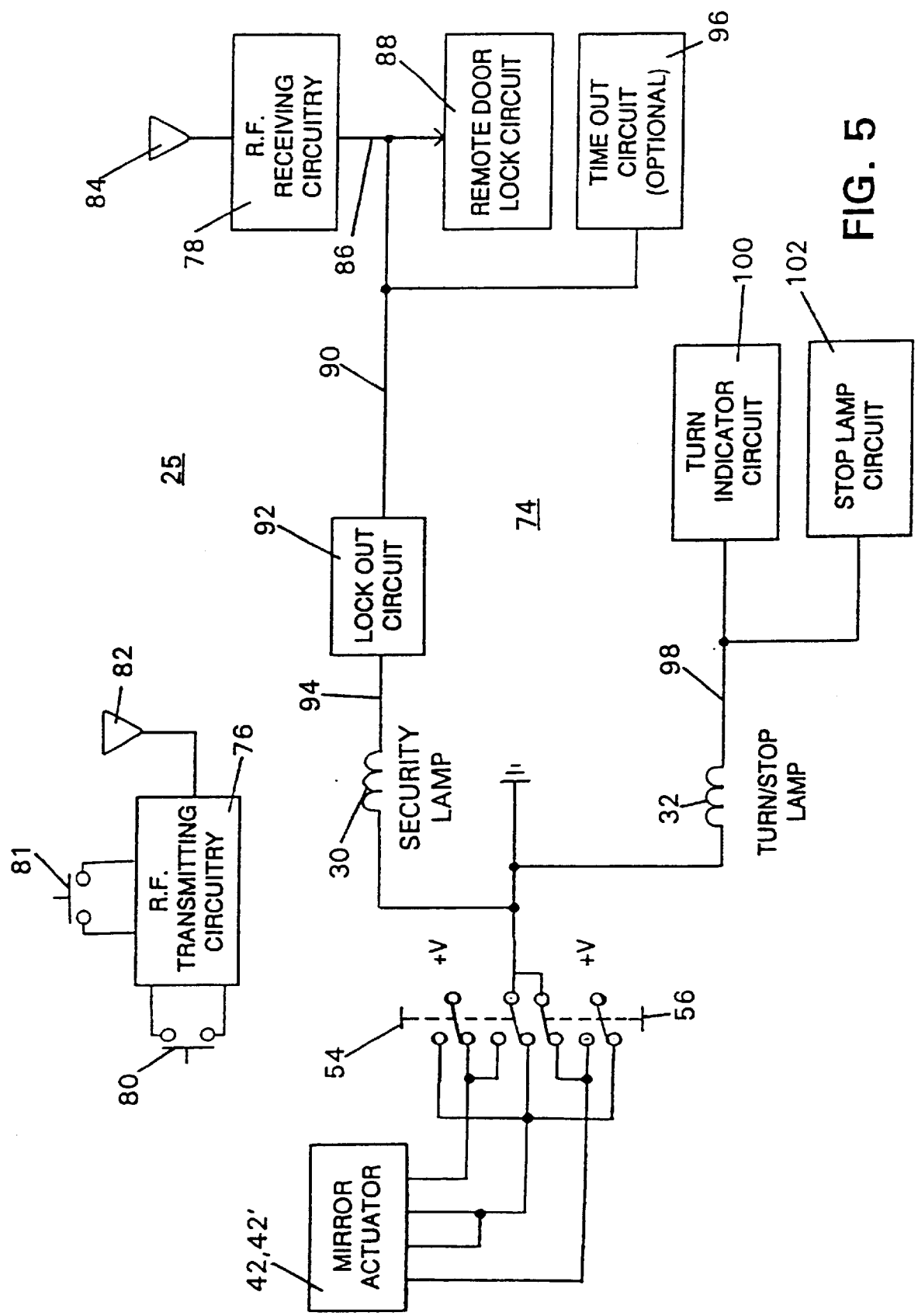
FIG. 5 is a block diagram of a control system according to the invention.

Referring now specifically to the drawings, and the illustrative embodiments depicted therein, a vehicle personal security lighting system 25 includes an exterior mirror assembly 26 having a conventional reflectance element 28, a security light 30, preferably white, or clear, and a signal light 32, preferably red, incorporated in a housing, or casing, 34. Casing 34 is connected by a neck 36 to a stationary panel or sail 38 adapted for incorporation with the forward portion of the vehicle side window assembly, and which mounts mirror assembly 26 to the door of a vehicle 40 (see FIG. 10). Reflectance element 28 may be any of several reflectors, such as glass coated on its first or second surface with a suitable reflective layer or layers, such as those disclosed in U.S. Pat. No. 5,179,471, the disclosure of which is hereby incorporated by reference herein, or an electro-optic cell including a liquid crystal, electrochromic, or electrochemichromic fluid, gel or solid-state compound for varying the reflectivity of the mirror in response to electrical voltage applied thereacross as disclosed in U.S. Pat. No. 5,151,824, the disclosure of which is hereby incorporated by reference herein.

Figure 7:
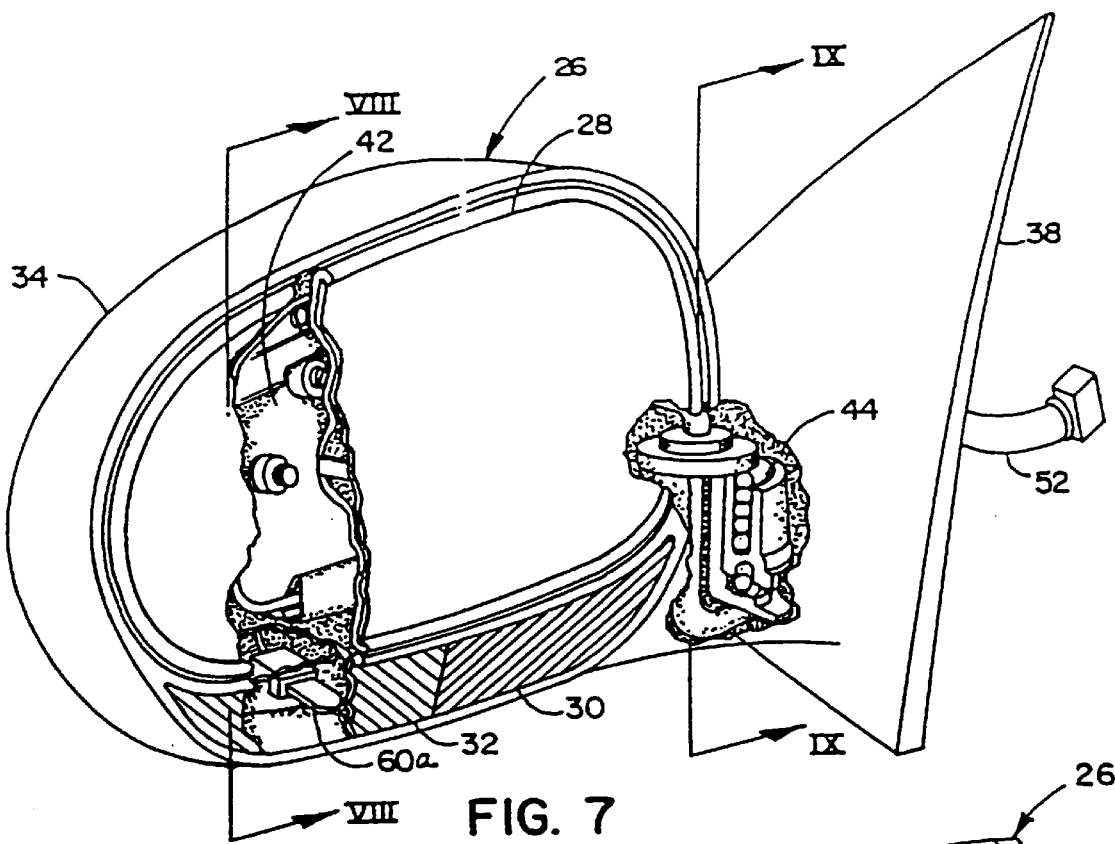
FIG. 7 is a breakaway perspective view of the system in FIG. 1 revealing internal components thereof.
Figure 9:
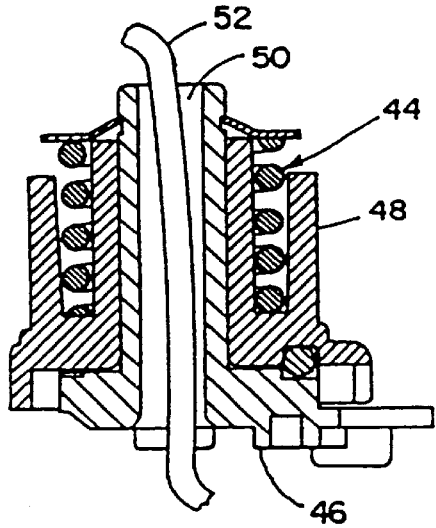
FIG. 9 is a sectional view taken along the lines IX—IX in FIG. 7.
Figure 8:
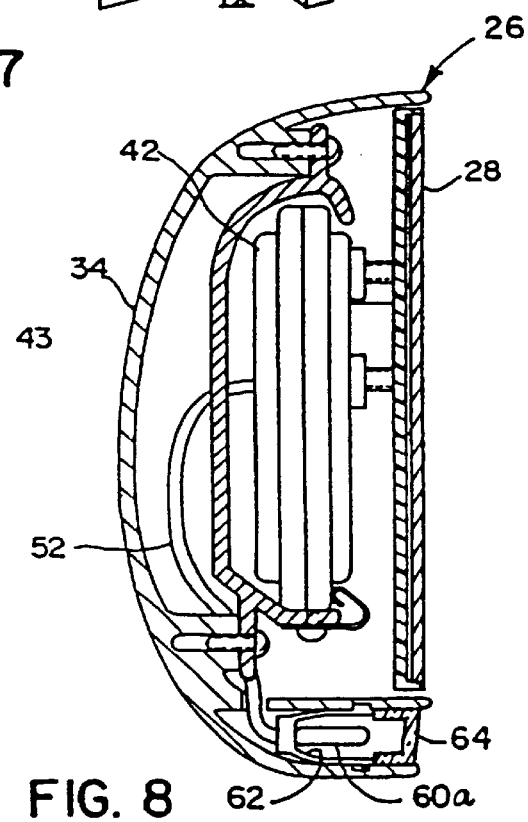
FIG. 8 is a sectional view taken along the lines VIII—VIII in FIG. 7.
Figure 20:
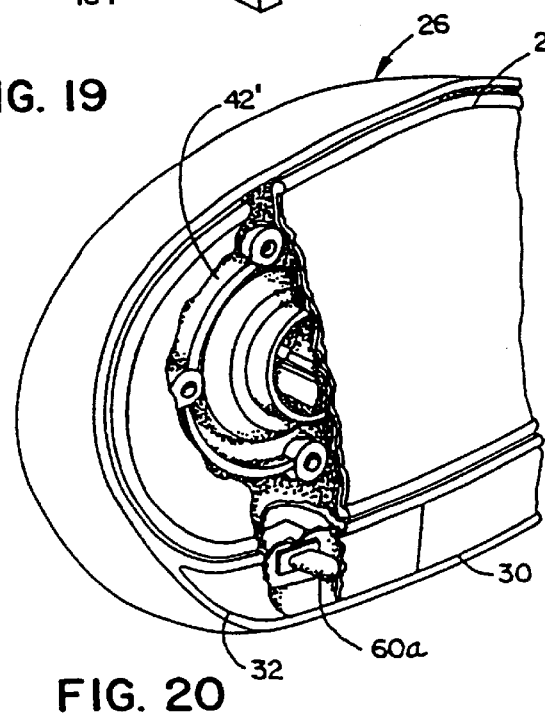
FIG. 20 is the same view as FIG. 7 of the invention embodied in an alternative mirror structure.

With reference to FIGS. 7 and 8, as is conventional, reflectance element 28 is mounted to a bracket 43 by an actuator 42. Casing 34 is mounted to bracket 43. Actuator 42 provides remote positioning of reflectance element 28 on two orthogonal axes. Such actuators are well known in the art and may include a jackscrew-type actuator 42 such as Model No. H16-49-8001 (right-hand mirror) and Model No. H16-49-8051 (left-hand mirror) by Matsuyama of Kawagoe City, Japan, as illustrated in FIG. 7, or a planetary-gear actuator 42' such as Model No. 540 (U.S. Pat. No. 4,281,899) sold by Industrie Koot BV (IKU) of Montfoort, Netherlands, as illustrated in FIG. 20. As is also conventional, the entire casing 34 including actuator 42, 42' is mounted via bracket 43 for breakaway motion with respect to stationary panel 38 by a breakaway joint assembly 44. Breakaway joint assembly 44 (FIG. 9) includes a stationary member 46 attached to vehicle 40, a pivoting member 48 to which bracket 43 and casing 34 are attached, and a wire-way 50 through which a wire cable 52 passes. Wire cable 52 includes individual wires to supply control signals to actuator 42, 42', as well as signals to control the level of reflectivity, if reflective element 28 is of the variable reflectivity type noted above, such as an electrochromic mirror. Power may also be supplied through cable 52 for a heater (not shown) as disclosed in U.S. Pat. No. 5,151,824 in order to evaporate ice and dew from reflective element 28.

With reference to FIG. 5, actuator 42, 42' receives a first set of reversible voltage signals from a switch 54, in order to bidirectionally pivot in one axis, and a second set of reversible signals from a switch 56, in order to bidirectionally pivot in the opposite axis, as is conventional. Switches 54 and 56 are actuated by a common actuator (not shown) that is linked so that only one of the switches 54 and 56 may be actuated at a time. In this manner, actuator 42, 42' may utilize one common conductor for both switches 54, 56.

Each of the security light 30 and signal light 32 includes a light source 60 and reflector 62 behind a lens 64 (FIG. 8). Light source 60, reflector 62 and lens 64 are designed for security light 30 to project a pattern 66 of light, such as white light, through a clear, non-filtering lens, in order to establish a security zone around the vehicle (FIGS. 10–12). Pattern 66 extends rearward from mirror assembly 26. Vertically, pattern 66 contacts the ground at 68 in the vicinity of entry and exit by the vehicle occupants (FIGS. 10 and 12). Laterally, pattern 66 fans out into contact with the side 70a, 70b of the vehicle. This contact washes the sides of the vehicle to reflect the light in order to further illuminate the area in order to establish the security lighting zone (FIGS. 11 and 12). In a preferred embodiment, pattern 66 extends rearwardly from mirror assembly 26 without projecting any portion of the pattern forwardly of the mirror assembly.

Figure 14:
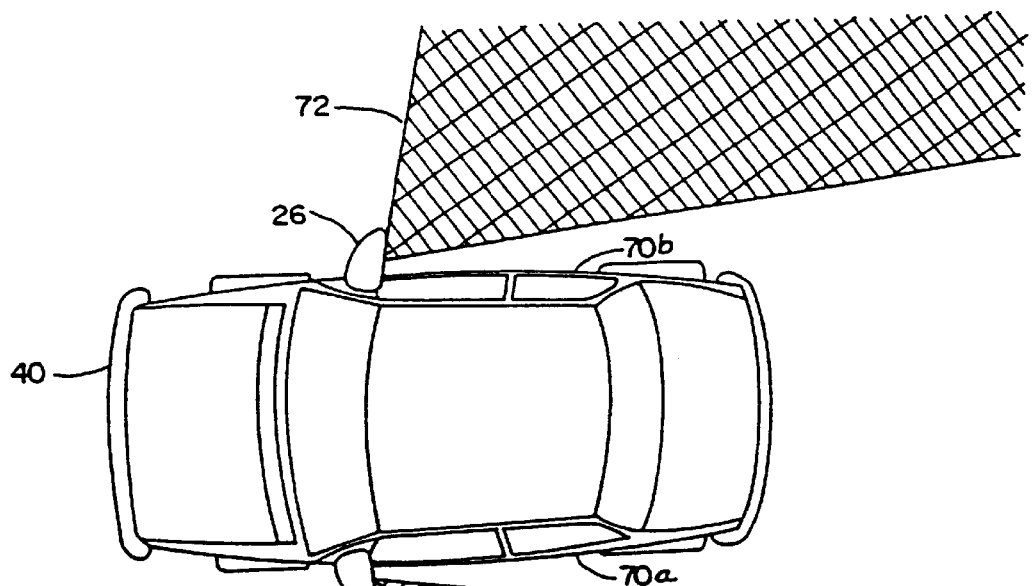
FIG. 14 is a top plan view of the vehicle and light pattern in FIG. 13.
Figure 15:
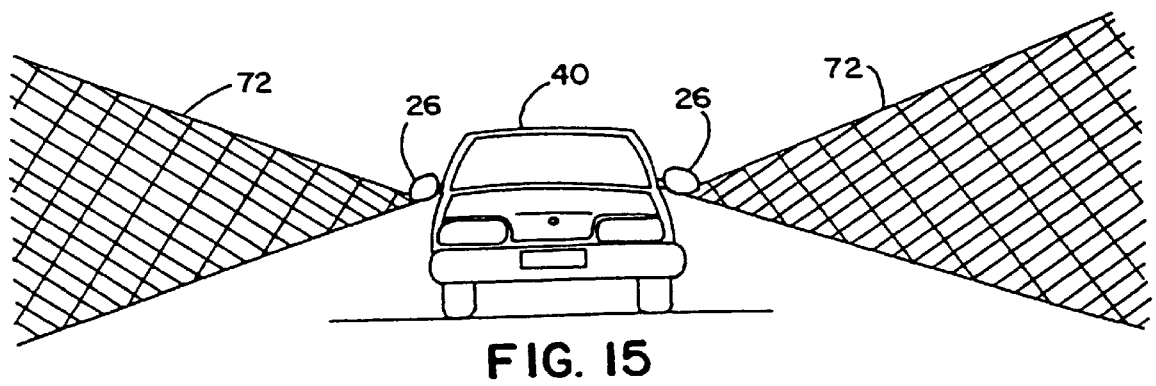
FIG. 15 is a rear elevation of the vehicle and light pattern in FIG. 13.

Signal light 32 generates a light pattern 72, which is directed generally horizontally rearwardly of vehicle 40 (FIGS. 13–15). Pattern 72 is laterally directed substantially away from side 70a, 70b of vehicle 40 so that the driver of vehicle 40 does not directly intercept pattern 72, although a minor intensity (such as 10%) of the pattern is intercepted by the driver in order to provide awareness of the actuating of the signal light. Pattern 72 fans laterally away from side 70a, 70b to an extent that is parallel the face of reflectance element 28, which is substantially perpendicular to side 70a, 70b (FIG. 14). Thus, the driver of another vehicle (not shown) passing vehicle 40 on the left or right side of vehicle 40 will intercept pattern 72 while the vehicle is behind and beside vehicle 40. Although, in the illustrated embodiment, lens 64 of signal light 32 is substantially planar, lens 64 of signal light 32 could be made to wrap around the outward side of casing 34 in order to function as a side marker for the vehicle as is required in some European countries.

Vehicle mirror assembly security system 25 is actuated by a control system 74 (FIG. 5). Control system 74 includes means for actuating security light 30 including a remote transmitting device 76 and a stationary receiving device 78. Transmitting device 76 may be remotely carried by the vehicle operator and includes switches 80 and 81 in order to actuate the transmitting circuitry to transmit a signal from antenna 82, which is received by antenna 84 of receiving device 78. Receiving device 78 is mounted in the vehicle, such as in the vehicle trunk compartment, and includes an output 86 in order to operate remote door lock circuit 88, as is conventional. Output 86 is, additionally, provided as an input 90 of a lockout circuit 92, whose output 94 is supplied to security lamp 30. Input 90 may additionally be actuated by a timeout circuit 96, which is conventionally supplied in a vehicle in order to dim the interior lights, following a slight delay, after the occurrence of an event, such as the opening and closing of the doors of the vehicle. Signal light 32 is actuated on line 98 from either a turn indicator circuit 100 or a stop lamp indicator circuit 102, both of which are conventionally supplied with vehicle 40.

In operation, when the operator actuates switch 80 of transmitting device 76, receiving device 78 produces a signal on output 86 in order to cause remote door lock circuit 88 to unlock the doors. Alternatively, actuation of switch 81 on remote transmitting device 76 causes receiving device 78 to produce a signal on output 86 to cause remote door lock circuit 88 to lock the vehicle doors. The signal on output 86 actuates security lamp 30 provided that lockout circuit 92 does not inhibit the signal. Lockout circuit 92 responds to operation of the vehicle in order to avoid actuation of security lamp 30 when the vehicle is in motion. Such lockout circuits are conventional and may be responsive to placing of the vehicle transmission in gear or sensing of the speed of the vehicle, or the like. Security lamp 30 is also actuated, in response to interior lighting device timeout circuit 96, whenever the interior lights of the vehicle are being actuated by timeout circuit 96, provided that lockout circuit 92 does not inhibit the signal from security lamp 30. This is provided in order to allow security lamp 30 to be actuated in response to the entry to, or exit from, vehicle 40 without the operator utilizing transmitting device 76 to lock or unlock the doors. Signal lamp 32 is actuated in response to turn indicator circuit 100 whenever the operator moves the indicator stick in the direction of that particular signal lamp 32. Signal lamp 32 may additionally be actuated from stop lamp circuit 102 in response to the driver actuating the vehicle's brakes.

In the embodiment illustrated in FIGS. 1 and 5, lens 64 of signal lamp 32 is adapted to filter the light provided from lamp 32 so as to be red and is provided for vehicles 40 in which the stop lamps and rear turn indicator lamps are, likewise, red. Because signal lamp 32 shines red, pattern 72 is restricted from extending forward of the vehicle. This is in order to comply with regulations prohibiting red lights from causing confusion with emergency vehicles by shining forward of the vehicle.

Figure 6:
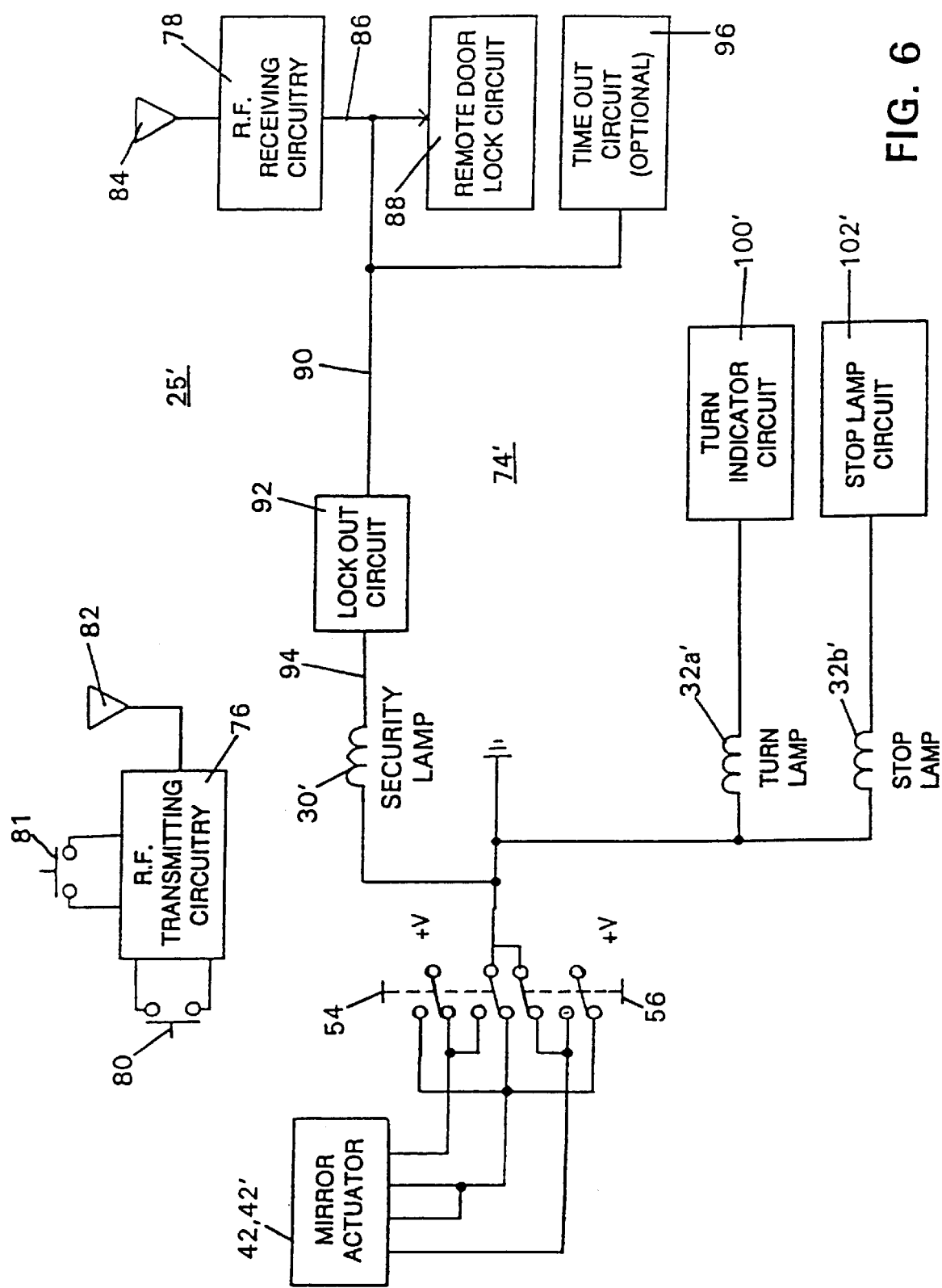
FIG. 6 is a block diagram of an alternative embodiment of a control system according to the invention.

For vehicles having red stoplights and amber turn indicators in the rear, a vehicle mirror security assembly 25' includes an exterior mirror assembly 26' and a control system 74' (FIGS. 4 and 6). Exterior mirror assembly 26' includes a security light 30', preferably white or clear, and a pair of signal lights 32a' and 32b'. Signal light 32a' is amber and is actuated directly from turn indicator circuit 100'. This amber color can be provided either by an amber light bulb or source, or a filtering lens providing an amber color. Signal light 32b' is red and is actuated directly from stop lamp circuit 102'. Each of the light patterns generated by signal lights 32a' and 32b' substantially correspond with light pattern 72. The light pattern generated by security light 30' is substantially equivalent to pattern 66. With the exception that turn signal indicator circuit 100' actuates signal light 32a' and stop lamp circuit 102' actuates signal light 32b', control system 74' operates substantially identically with control circuit 74.

Figure 16:
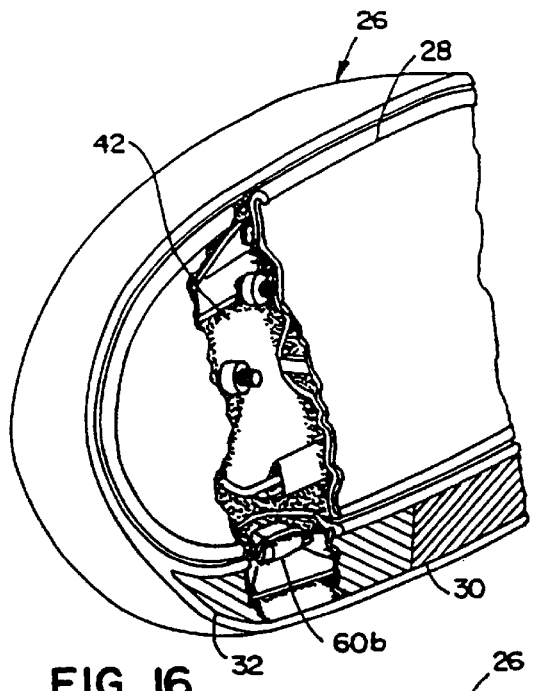
FIG. 16 is the same view as FIG. 7 of a first alternative light source according to the invention.
Figure 17:
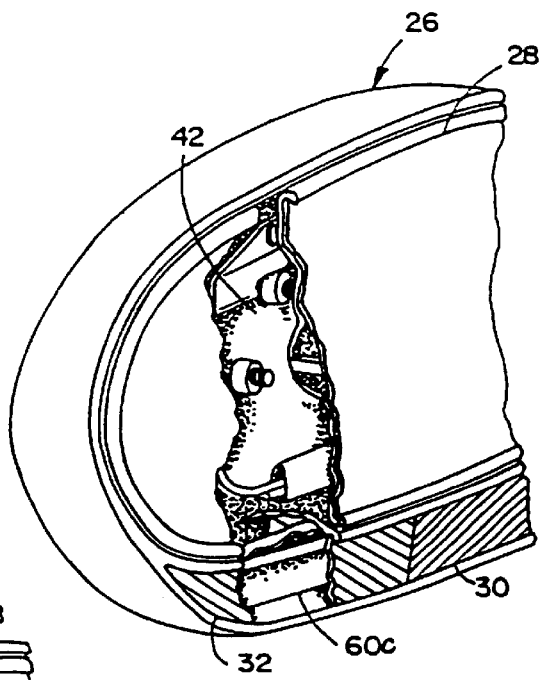
FIG. 17 is the same view as FIG. 7 of a second alternative light source.
Figure 18:
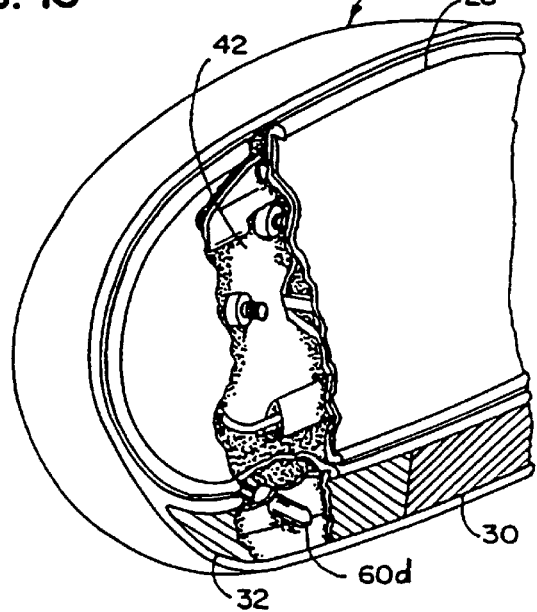
FIG. 18 is the same view as FIG. 7 of a third alternative light source.
Figure 19:
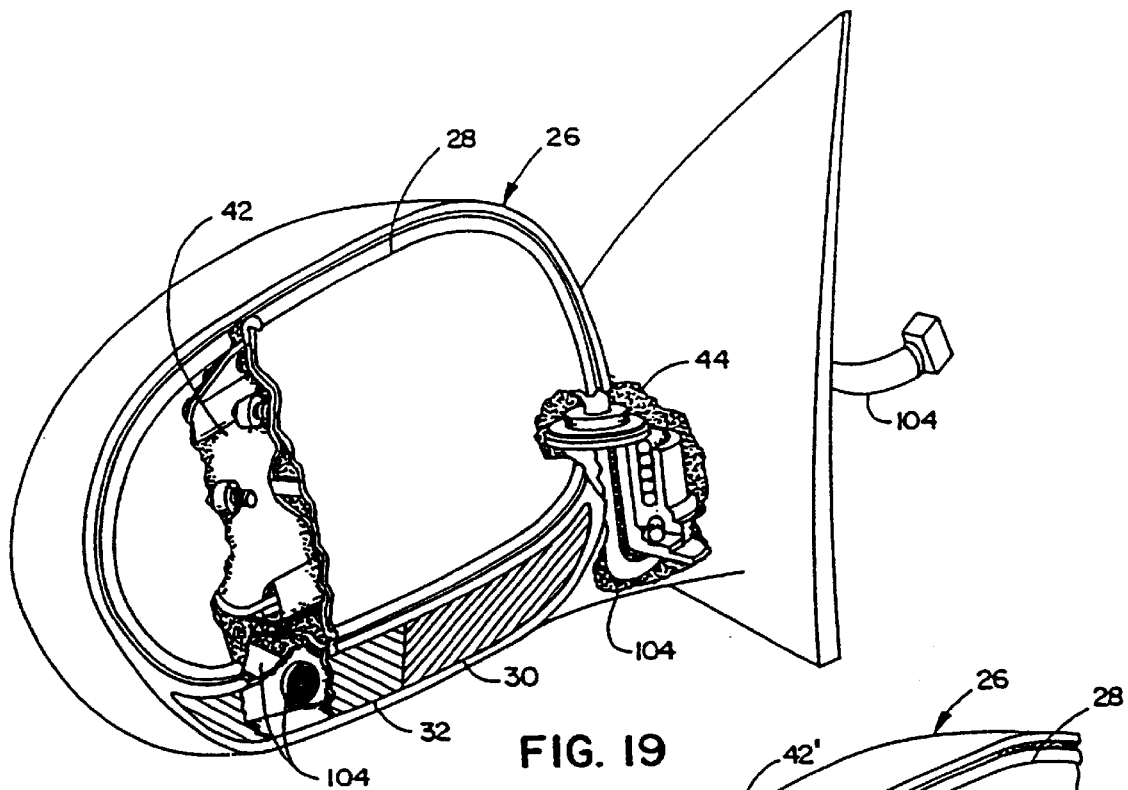
FIG. 19 is the same view as FIG. 7 of a fourth alternative light source.

In the illustrated embodiment, light source 60, for both security light 30 and signal light 32, may be supplied as a conventional incandescent or halogen lamp 60a (FIG. 7). Alternatively, a conventional incandescent fuse lamp 60b may be used (FIG. 16). Alternatively, a vacuum fluorescent lamp 60c, which is available in various colors, may be used (FIG. 17). Alternatively, a light emitting diode 60d may be used (FIG. 18). As yet a further alternative, a fiber optic bundle 104 forming a light pipe may be positioned to discharge light behind lens 64. Fiber optic bundle 104 passes through breakaway joint 44 in wire-way 50 in order to transmit light from a source (not shown) within vehicle 40. By way of example, lens 64 may be supplied as a segmented lens, a prismatic lens, or a Fresnel lens in order to generate light patterns 66 and 72. Bracket 43 and breakaway joint 44 are marketed by Donnelly Corporation, the present assignee, of Holland, Mich. The remote actuator composed of remote transmitting device 76 and stationary receiving device 78 may be radio frequency coupled, as is conventional. Alternatively, they may be infrared coupled as illustrated in U.S. Pat. No. 4,258,352.

Although the invention is illustrated in a mirror assembly utilizing an automatic remote actuator, it may also be applied to manual remote actuators and handset actuators. As previously set forth, reflectance element 28 may be conventional or may be supplied as an electrochromic self-dimming mirror. Although the invention is illustrated with breakaway joint 44, the invention may also be applied to mirrors that are rigidly mounted to the vehicle.

Changes and modifications in the specifically described embodiments can be carried out without departing from the principles of the invention, which is intended to be limited only by the scope of the appended claims, as interpreted according to the principles of patent law including the Doctrine of Equivalents.

What is claimed is:

1. A vehicular exterior rearview mirror system comprising:

an exterior mirror assembly adapted for mounting to a side of a first vehicle;

said exterior mirror assembly comprising a casing, said casing defining a cavity, a positionable reflectance element incorporated in said cavity, said reflectance element adjustably mounted with respect to said casing on an actuator for providing remote positioning of said reflectance element;

a signal light assembly including a light source;

said signal light assembly included in said exterior mirror assembly, said signal light assembly fixedly mounted with respect to said casing and separate from said positionable reflectance element;

said signal light assembly adapted to project a pattern of light from said exterior mirror assembly directed rearwardly of the first vehicle and observable to a driver of a second vehicle passing from behind the side of the first vehicle equipped with said signal light assembly, said pattern of light of said signal light assembly substantially unobserved by a driver of the first vehicle when said exterior mirror assembly is mounted to said side of the first vehicle;

said signal light assembly adapted for connection with a turn signal circuit of the first vehicle such that said signal light assembly actuates when the turn signal circuit is being actuated in order to provide a warning light to the driver of the second vehicle passing the first vehicle that a lane change by the first vehicle is intended, said warning light being substantially unobserved by the driver of the first vehicle; and said pattern of light substantially unobserved by a driver of a third vehicle approaching from a forward direction of said first vehicle when said signal light assembly is actuated by the turn signal circuit of the first vehicle.

2. The mirror system of claim 1 wherein said signal light assembly comprises a lens.

3. The mirror system of claim 2 wherein said lens is selected from the group consisting of a segmented lens, a prismatic lens and a Fresnel lens.

4. The mirror system of claim 2 wherein said pattern of light projecting rearwardly of said first vehicle is selected from the group consisting of red colored light and amber colored light.

5. The mirror system of claim 2 wherein said lens comprises a filtering lens.

6. The mirror system of claim 5 wherein said filtering lens comprises an amber filtering lens.

7. The mirror system of claim 5 wherein said filtering lens comprises a red filtering lens.

8. The mirror system of claim 1 wherein said signal light assembly comprises a reflector.

9. The mirror system of claim 1 wherein said light source comprises an incandescent source.

10. The mirror system of claim 1 wherein said light source comprises at least one light-emitting diode.

11. The mirror system of claim 1 wherein said light source comprises a fluorescent source.

12. The mirror system of claim 1 wherein said light source comprises a light pipe.

13. The mirror system of claim 12 wherein said light pipe comprises a fibre optic bundle.

14. The mirror system of claim 1 wherein said pattern of light projecting rearwardly of the first vehicle is selected from the group consisting of red colored light and amber colored light.

15. The mirror system of claim 1 wherein said pattern of light projecting rearwardly of the first vehicle comprises amber colored light.

16. The mirror system of claim 15 wherein said signal light assembly includes a light source selected from the group consisting of an incandescent lamp, a fluorescent lamp, a light-emitting diode and a light pipe.

17. The mirror system of claim 1 wherein said signal light assembly includes at least one of an amber light source and an amber filtering lens.

18. The mirror system of claim 1 wherein said signal light assembly comprises a halogen lamp.

19. The mirror system of claim 1 wherein said exterior mirror assembly further incorporates a floodlight adapted to project another pattern of light generally downwardly and rearwardly on an area adjacent a portion of the first vehicle in order to create a lighted security zone in said area.

20. The mirror system of claim 1 wherein said reflectance element comprises an electrochromic reflectance element.

21. The mirror system of claim 1 wherein said mounting of said exterior mirror assembly comprises a breakaway joint assembly.

22. The mirror system of claim 1 wherein said light source comprises a light pipe and wherein said pattern of light projecting rearwardly of the first vehicle comprises amber colored light.

23. The mirror system of claim 1 wherein said light source comprises at least one light-emitting diode and wherein said pattern of light projecting rearwardly of the first vehicle comprises amber colored light.

24. The mirror system of claim 1 wherein said light source comprises an incandescent source and wherein said pattern of light projecting rearwardly of the first vehicle comprises amber colored light.

25. The mirror system of claim 1 wherein said light source comprises a fluorescent source and wherein said pattern of light projecting rearwardly of the first vehicle comprises amber colored light.

26. A vehicular exterior rearview mirror system comprising:
an exterior mirror assembly adapted for mounting to a side of a first vehicle;
said exterior mirror assembly comprising a casing, said casing defining a cavity, a positionable reflectance element incorporated in said cavity, said reflectance element being moveably mounted with respect to said casing on an actuator for providing remote positioning of said reflectance element;
a signal light assembly including a light source;
said signal light assembly included in said exterior mirror assembly, said signal light assembly fixedly mounted with respect to said casing and separate from said positionable reflectance element;
said signal light assembly adapted to project a pattern of light from said exterior mirror assembly directed rearwardly of the first vehicle and observable to a driver of a second vehicle passing from behind the side of the first vehicle equipped with said signal light assembly, said pattern of light of said signal light assembly substantially unobserved by a driver of the first vehicle when said exterior mirror assembly is mounted to said side of the first vehicle;
said signal light assembly adapted for connection with a turn signal circuit of the first vehicle such that said signal light assembly actuates when the turn signal circuit is being actuated in order to provide a warning light to the driver of the second vehicle passing the first vehicle that a lane change by the first vehicle is intended, said warning light being substantially unobserved by the driver of the first vehicle;
said pattern of light substantially unobserved by a driver of a third vehicle approaching from a forward direction of the first vehicle when said signal light assembly is actuated by the turn signal circuit of the first vehicle;
said light source selected from the group consisting of an incandescent lamp, a fluorescent lamp, a light-emitting diode and a light pipe; and
wherein said exterior mirror assembly comprises a breakaway exterior mirror assembly.

27. The mirror system of claim 26 wherein said signal light assembly comprises a lens.

28. The mirror system of claim 27 wherein said lens is selected from the group consisting of a segmented lens, a prismatic lens and a Fresnel lens.

29. The mirror system of claim 27 wherein said pattern of light projecting rearwardly of said first vehicle is selected from the group consisting of red colored light and amber colored light.

30. The mirror system of claim 27 wherein said signal light assembly comprises a reflector.

31. The mirror system of claim 27 wherein said lens comprises a filtering lens.

32. The mirror system of claim 31 wherein said filtering lens comprises an amber filtering lens.

33. The mirror system of claim 31 wherein said filtering lens comprises a red filtering lens.

34. The mirror system of claim 26 wherein said signal light assembly comprises a reflector.

35. The mirror system of claim 26 wherein said light source comprises an incandescent source.

36. The mirror system of claim 35 wherein said signal light assembly comprises a lens.

37. The mirror system of claim 26 wherein said light source comprises at least one light-emitting diode.

38. The mirror system of claim 26 wherein said light source comprises a fluorescent source.

39. The mirror system of claim 26 wherein said light source comprises a light pipe.

40. The mirror system of claim 39 wherein said light pipe comprises a fibre optic bundle.

41. The mirror system of claim 26 wherein said pattern of light projecting rearwardly of said first vehicle is selected from the group consisting of red colored light and amber colored light.

42. The mirror system of claim 26 wherein said pattern of light projecting rearwardly of the first vehicle comprises amber colored light.

43. The mirror system of claim 26 wherein said signal light includes at least one of an amber light source and an amber filtering lens.

44. The mirror system of claim 26 wherein said signal light assembly comprises a halogen lamp.

45. The mirror system of claim 26 wherein said exterior mirror assembly further incorporates a floodlight adapted to project another pattern of light generally downwardly and rearwardly on an area adjacent a portion of the first vehicle in order to create a lighted security zone in said area.

46. The mirror system of claim 26 wherein said reflectance element comprises an electrochromic reflectance element.

47. The mirror system of claim 26 wherein said light source comprises a light pipe and wherein said pattern of light projecting rearwardly of the first vehicle comprises amber colored light.

48. The mirror system of claim 26 wherein said light source comprises at least one light-emitting diode and wherein said pattern of light projecting rearwardly of the first vehicle comprises amber colored light.

49. The mirror system of claim 26 wherein said light source comprises an incandescent source and wherein said pattern of light projecting rearwardly of the first vehicle comprises amber colored light.

50. The mirror system of claim 26 wherein said light source comprises a fluorescent source and wherein said pattern of light projecting rearwardly of the first vehicle comprises amber colored light.

* * * * *